United States Patent
Zhang et al.

(10) Patent No.: US 10,155,918 B2
(45) Date of Patent: Dec. 18, 2018

(54) SOLID COMPOSITION COMPRISING A POLYSACCHARIDE AND A HYDROPHOBIC COMPOUND, THE PROCESS AND USE THEREOF

(71) Applicant: RHODIA OPERATIONS, Paris (FR)

(72) Inventors: Hai Zhou Zhang, Singapore (SG); Nikolay Christov, Singapore (SG); Da Wei Jin, Singapore (SG); Lin He, Singapore (SG)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 15/538,066

(22) PCT Filed: Dec. 22, 2014

(86) PCT No.: PCT/EP2014/079027
§ 371 (c)(1),
(2) Date: Jun. 20, 2017

(87) PCT Pub. No.: WO2016/101980
PCT Pub. Date: Jun. 30, 2016

(65) Prior Publication Data
US 2017/0342346 A1  Nov. 30, 2017

(51) Int. Cl.
| | | |
|---|---|---|
| *C11D 3/37* | (2006.01) | |
| *C11D 3/22* | (2006.01) | |
| *C11D 3/00* | (2006.01) | |
| *C11D 3/20* | (2006.01) | |
| *C11D 1/62* | (2006.01) | |
| *C11D 1/66* | (2006.01) | |
| *C11D 3/38* | (2006.01) | |
| *C08L 1/08* | (2006.01) | |
| *C08L 5/02* | (2006.01) | |
| *C08L 5/12* | (2006.01) | |
| *C11D 3/43* | (2006.01) | |
| *D06M 13/46* | (2006.01) | |
| *D06M 15/03* | (2006.01) | |
| *D06M 23/08* | (2006.01) | |

(52) U.S. Cl.
CPC ............... *C11D 3/227* (2013.01); *C08L 1/08* (2013.01); *C08L 5/02* (2013.01); *C08L 5/12* (2013.01); *C11D 1/62* (2013.01); *C11D 1/667* (2013.01); *C11D 3/001* (2013.01); *C11D 3/0015* (2013.01); *C11D 3/2013* (2013.01); *C11D 3/2093* (2013.01); *C11D 3/222* (2013.01); *C11D 3/225* (2013.01); *C11D 3/38* (2013.01); *C11D 3/43* (2013.01); *D06M 13/46* (2013.01); *D06M 15/03* (2013.01); *D06M 23/08* (2013.01); *D06M 2200/50* (2013.01)

(58) Field of Classification Search
CPC ....... C11D 1/667; C11D 3/001; C11D 3/2093; C11D 3/222; C11D 3/227
See application file for complete search history.

(56) References Cited

U.S. PATENT DOCUMENTS

| | | | |
|---|---|---|---|
| 2,813,093 A | 11/1957 | Caldwell et al. | |
| 3,472,840 A | 10/1969 | Stone et al. | |
| 4,119,487 A | 10/1978 | Tessler et al. | |
| 4,237,016 A | 12/1980 | Howard et al. | |
| 4,422,949 A * | 12/1983 | Ooms .................. | C11D 1/62 510/524 |
| 4,808,321 A | 2/1989 | Darlene et al. | |
| 5,066,414 A | 11/1991 | Chang et al. | |
| 5,531,910 A | 7/1996 | Severns et al. | |
| 6,492,322 B1 | 12/2002 | Cooper et al. | |
| 2014/0206587 A1* | 7/2014 | Chen .................. | A61K 8/66 510/119 |

FOREIGN PATENT DOCUMENTS

| | | | |
|---|---|---|---|
| EP | 1502942 | * | 2/2005 |
| EP | 1502942 A1 | | 2/2005 |
| EP | 1062312 | * | 4/2005 |
| FR | 1492597 A | | 8/1967 |
| WO | 9323510 A1 | | 11/1993 |
| WO | 05100444 A1 | | 10/2005 |
| WO | 06055787 A1 | | 5/2006 |

OTHER PUBLICATIONS

D.B. Solarek., Modified Starches: Properties and Uses, Cationic Starch, Chapter 8, 1986.
Poucher, Journal of the Society of Cosmetic Chemists, 1955, vol. 6, No. 2, p. 80-94.

* cited by examiner

*Primary Examiner* — John R Hardee
(74) *Attorney, Agent, or Firm* — Jarrod N. Raphael

(57) ABSTRACT

The present invention provides a solid composition comprising a polysaccharide and a hydrophobic compound having a melting point of between 30° C. and 90° C. The solid composition may further comprise a quaternary ammonium compound, wherein the weight ratio of the polysaccharide and the hydrophobic compound is between 1:50 and 50:1. Preferably, the solid composition is substantially free or completely free of water. The solid composition shows excellent stability at a temperature up to 45° C. The present invention also provides a process for preparing the solid composition and a liquid composition comprising said solid composition, and a method for conditioning a fabric by using said solid composition or said liquid composition as well.

16 Claims, No Drawings

SOLID COMPOSITION COMPRISING A POLYSACCHARIDE AND A HYDROPHOBIC COMPOUND, THE PROCESS AND USE THEREOF

TECHNICAL FIELD

The present invention relates to a solid composition comprising a polysaccharide and a hydrophobic compound. The solid composition may further comprise a quaternary ammonium compound. Preferably, the solid composition is substantially free or completely free of water. The solid composition can be used for various home care and personal care applications, in particular, for fabric conditioning applications.

BACKGROUND ART

Aqueous systems have been widely used for home care and personal care applications by consumers or industrial users. Such aqueous systems, for example, aqueous fabric conditioning compositions, comprise large amount of water, and therefore, they require a great amount of packaging materials and large shelf space. Also, transportation of such aqueous systems is expensive. One solution to solve these problems is to provide solid systems for home care and personal care applications, such as solid fabric conditioning compositions.

Referring to fabric conditioning compositions, such compositions generally comprise one or more fabric conditioning actives. One widely used fabric conditioning active is quaternary ammonium compound which generally comprise long chain alkyl groups connected to the nitrogen atom. Quaternary ammonium compounds are known to impart fabrics "softness". One significant improvement in the fabric conditioning field is to use quaternary ammonium compound with at least one ester functional group inserted in some or all of the long chain alkyl groups. Such quaternary ammonium compounds are called "ester quaternary ammonium compounds" or "ester quats". One advantage of ester quats is that they are rapidly biodegradable, thus more eco-friendly. Use of ester quats for fabric conditioning compositions has been described, e.g. in U.S. Pat. No. 4,808,321 issued on Feb. 28, 1989; U.S. Pat. No. 5,066,414 issued on Nov. 19, 1991; U.S. Pat. No. 5,531,910 issued on Jul. 2, 1996.

Another development in the fabric conditioning field is addition of cationic polymers to the fabric conditioning compositions for various benefits. Useful cationic polymers include cationic polysaccharide. Such use of the cationic polysaccharides has been described, e.g. in U.S. Pat. No. 4,237,016 issued on Dec. 2, 1980, U.S. Pat. No. 6,492,322 issued on Dec. 10, 2002.

There are certain problems associated with known fabric conditioning systems comprising ester quats and cationic polysaccharides. For example, ester quats are susceptible to degradation, especially when they are present in high concentrations in water. This phenomenon may be due to their biodegradable nature. Furthermore, when quats coexist with polysaccharides, such as cationic polysaccharides, in a liquid system, the system is usually unstable. In particular, the quat component and the polysaccharide component tend to undergo phase separation. In addition, polysaccharides are usually in powder form and cause difficulties for users, notably industrial users, to handle them.

There is a need to provide compositions comprising polysaccharides which are in a form easy for handling.

There is also a need to provide stable compositions which incorporate quaternary ammonium compounds and polysaccharides, especially stable compositions incorporate quaternary ammonium compounds and polysaccharides at high concentrations.

SUMMARY OF INVENTION

In a first aspect of the present invention, there is provided a solid composition comprising a polysaccharide and a hydrophobic compound having a melting point of between 30° C. and 90° C.

In one embodiment, the hydrophobic compound is an ester of fatty acid.

In another embodiment, the polysaccharide is a cationic polysaccharide, a nonionic polysaccharide or a mixture thereof.

In still another embodiment, the polysaccharide is a cationic guar, a nonionic guar or a mixture thereof.

In a second aspect of the present invention, there is provided a solid composition comprising a quaternary ammonium compound, a polysaccharide and a hydrophobic compound having a melting point of between 30° C. and 90° C., wherein the weight ratio of the polysaccharide and the hydrophobic compound is between 1:50 and 50:1.

In one embodiment, the weight ratio of the polysaccharide and the hydrophobic compound is between 1:30 and 30:1.

In another embodiment, the weight ratio of the polysaccharide and the hydrophobic compound is between 1:10 and 10:1.

In still another embodiment, the quaternary ammonium compound has the general formula (I):

wherein: $R_1$, $R_2$, $R_3$ and $R_4$, which may be the same or different, is a $C_1$-$C_{30}$ hydrocarbon group, optionally containing a heteroatom or an ester or amide group;

X is an anion;

y is the valence of X.

In still another embodiment, the quaternary ammonium compound has the general formula (III):

wherein:

$R_9$ group is independently selected from $C_1$-$C_4$ alkyl or hydroxylalkyl group;

$R_8$ group is independently selected from $C_1$-$C_{30}$ alkyl or alkenyl group;

T is —C(=O)—O— or —O—C(=O)—;

n is an integer from 0 to 5;

X is an anion;

y is the valence of X.

In still another embodiment, the quaternary ammonium compound has the general formula (IV):

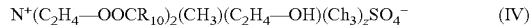

wherein $R_{10}$ is a $C_{12}$-$C_{20}$ alkyl group;

z is an integer from 1 to 3.

In still another embodiment, the quaternary ammonium compound is chosen from the group consisting of:

TET: Di(tallowcarboxyethyl)hydroxyethyl methyl ammonium methylsulfate;

TEO: Di(oleocarboxyethyl)hydroxyethyl methyl ammonium methylsulfate;

TES: Distearyl hydroxyethyl methyl ammonium methylsulfate;

TEHT: Di(hydrogenated tallow-carboxyethyl)hydroxyethyl methyl ammonium methylsulfate;

TEP: Di(palmiticcarboxyethyl)hydroxyethyl methyl ammonium methylsulfate;

DEEDMAC: Dimethylbis[2-[(1-oxooctadecyl)oxy]ethyl] ammonium chloride; and

DHT: Dihydrogenated tallowdimethylammonium chloride.

In still another embodiment, the solid composition is substantially free or completely free of water.

In a third aspect of the present invention, there is provided a process for preparing a solid composition comprising the steps of (i) providing a quaternary ammonium compound in liquid form;

(ii) combining a polysaccharide, a hydrophobic compound having a melting point of between 30° C. and 90° C. with the quaternary ammonium compound to obtain a mixture;

(iii) solidifying the mixture;

wherein the weight ratio of the polysaccharide and the hydrophobic compound is between 1:50 and 50:1.

In one embodiment, the step (i) is melting the quaternary ammonium compound and the step (iii) is cooling the mixture.

In a forth aspect of the present invention, there is provided a process for preparing a liquid composition, comprising the step of mixing the solid composition according to the first or the second aspect of the present invention with a solvent selected from water, organic solvents or a mixture thereof.

In a fifth aspect of the present invention, there is provided a liquid composition obtained by the process according to the forth aspect of the present invention.

In one embodiment, the liquid composition is an aqueous fabric conditioning composition.

The present invention also provides a method for conditioning a fabric, comprising the step of contacting the fabric with the solid composition according to the present invention during a drying cycle of a dryer.

The present invention also provides a method for conditioning a fabric, comprising the step of contacting the fabric with an aqueous medium comprising the liquid composition according to the present invention during a rinse cycle of an automatic laundry machine or during manual wash.

DETAILED DESCRIPTION

Throughout the description, including the claims, the term "comprising one" or "comprising a" should be understood as being synonymous with the term "comprising at least one", unless otherwise specified, "between" and "from . . . to . . . " should be understood as being inclusive of the limits.

As used herein, "weight percent," "wt %," "percent by weight," "% by weight," and variations thereof refer to the concentration of a substance as the weight of that substance divided by the total weight of the composition and multiplied by 100.

"Alkyl" as used herein means a straight chain or branched saturated aliphatic hydrocarbon group and is intended to include both "unsubstituted alkyls" and "substituted alkyls", the latter of which refers to alkyl moieties having substituents (such as hydroxyl group and halogen group) replacing a hydrogen on one or more carbon atoms of the alkyl group. "Alkenyl", as used herein, refers to an aliphatic group containing at least one double bond and is intended to include both "unsubstituted alkenyls" and "substituted alkenyls", the latter of which refers to alkenyl moieties having substituents (such as hydroxyl group and halogen group) replacing a hydrogen on one or more carbon atoms of the alkenyl group.

As used herein, the term "solid composition" refers a composition in the form of a solid such as a powder, a particle, an agglomerate, a flake, a granule, a pellet, a tablet, a brick, a paste, a block such as a molded block, a unit dose, or another solid form known to those of skill in the art. The term "solid" refers to the state of the composition under the expected conditions of storage and use of the composition. In general, it is expected that the composition will remain in solid form at ambient temperature (approximately 25° C.), preferably, the composition will remain in solid form when exposed to the temperatures of 35° C. When referring to a paste, it is meant that the solid composition will not flow perceptibly and will substantially retain its shape under moderate stress or pressure or mere gravity, as for example, the shape of a mold when removed from the mold, the shape of an article as formed upon extrusion from an extruder, and the like.

The term "solidifying" means the process of making a liquid, such as a melt, into solid form.

The term "liquid" as used herein means that a continuous phase or predominant part of the composition is liquid and that a composition is flowable. It is understood herein that liquid includes a melt.

The term "quaternary ammonium compound" as used herein refers to a compound containing at least one quaternized nitrogen wherein the nitrogen atom is attached to four organic groups. The quaternary ammonium compound may comprise one or more quaternized nitrogen atoms.

The term "polysaccharide" as used herein includes polysaccharide and its derivatives.

The term "cationic polysaccharide" as used herein refers to a cationic derivative of a polysaccharide. "Cationic" means permanently positively charged whatever the pH or non permanently charged, e.g. a derivative that can be cationic below a given pH and neutral above that pH. Non-modified polysaccharides, such as starch, cellulose, pectin, carageenan, guars, xanthans, dextrans, curdlans, chitosan, chitin, and the like, can be chemically modified to impart cationic charges thereon. A common chemical modification incorporates quaternary ammonium substituents to the polysaccharide backbones. Additional chemical modifications may include cross-linking, stabilization reactions (such as alkylation and esterification), phophorylations, hydrolyzations.

The term "nonionic polysaccharide" as used herein refers to a polysaccharide derivative that has been chemically modified to provide the polysaccharide derivative with a net neutral charge in a pH neutral aqueous medium; or a non-modified polysaccharide.

The term "amphoteric polysaccharide" as used herein refers to a polysaccharide derivative that has been chemically modified to bear both an anionic charge and a cationic charge.

In the context of this invention, the term "fabric conditioning" is used in the broadest sense to include any conditioning benefit(s) to textile fabrics, materials, yarns, and woven fabrics. One such conditioning benefit is softening fabrics. Other non-limiting conditioning benefits include fabric lubrication, fabric relaxation, durable press, wrinkle resistance, wrinkle reduction, ease of ironing, abrasion resistance, fabric smoothing, anti-felting, anti-pilling, crispness, appearance enhancement, appearance rejuvenation, color protection, color rejuvenation, anti-shrinkage, in-wear shape retention, fabric elasticity, fabric tensile strength, fabric tear strength, static reduction, water absorbency or repellency, stain repellency; refreshing, anti-microbial, odor resistance; perfume freshness, perfume longevity, and mixtures thereof.

In one aspect, there is provided a solid composition comprising a polysaccharide and a hydrophobic compound having a melting point of between 30° C. to 90° C. "Hydrophobic compound" refers to a compound tending not to combine with water, or incapable of dissolving in water; insoluble or immiscible in water. Generally, hydrophobic compounds are non-polar organic compounds. The solid composition may be in the form of a paste, a flake, a pellet, a tablet, a brick, a block such as a molded block, and the like. Polysaccharides are generally in powder form, which may be hazardous to the health and safety of the process operators and those in the surrounding environment. According to the present invention, the hydrophobic compound can provide a matrix which incorporates the polysaccharide powder within a solid suspension, and therefore, the resulting solid composition does not have any spreading of the polysaccharide powder into the surrounding environment. In addition, the solid composition may be processed into any desired size and shape.

The solid composition of the present invention may be used for various applications. In one aspect, the solid composition may be used as, or used for preparing, home care compositions or personal care compositions. Examples of the home care compositions include and are not limited to laundry detergents, fabric conditioning compositions, dishwashing liquids, wood and furniture polish, floor polish, tub and tile cleaners, toilet bowl cleaners, hard surface cleaners, window cleaners, antifog agents, drain cleaners, auto-dish washing detergents and sheeting agents, carpet cleaners, prewash spotters, rust cleaners and scale removers. Examples of the personal care compositions include and are not limited to shampoos, conditioning shampoos, body washes, moisturizing body washes, shower gels, skin cleansers, cleansing milks, in shower body moisturizers, pet shampoos, shaving preparations.

Polysaccharide

The solid composition according to the present invention comprises a polysaccharide. Preferably, the polysaccharide may be a cationic, nonionic or ampholytic polysaccharide. In aspects where the solid composition is used as, or used for preparing, a fabric conditioning composition, the polysaccharide is preferably a cationic polysaccharide or a nonionic polysaccharide.

A: Cationic Polysaccharide

Suitable cationic polysaccharides include cationic polysaccharide derivatives, for instance guar, cellulose derivatives and starch derivatives. The cationic polysaccharide can be obtained by chemically modifying polysaccharides, generally natural polysaccharides. By such modification, cationic groups (substituents) can be introduced into the polysaccharide backbone. Suitable cationic substituents include primary, secondary or tertiary amino groups or quaternary ammonium, sulfonium or phosphinium groups. In one embodiment, the cationic substituents are quaternary ammonium groups.

The cationic polysaccharides of the present invention include but are not limited to:

cationic guar and derivatives thereof, cationic cellulose and derivatives thereof, cationic starch and derivatives thereof, cationic callose and derivatives thereof, cationic xylan and derivatives thereof, cationic mannan and derivatives thereof.

Cationic celluloses suitable for the present invention include cellulose ethers comprising quaternary ammonium groups, cationic cellulose copolymers or celluloses grafted with a water-soluble quaternary ammonium monomer.

The cellulose ethers comprising quaternary ammonium groups are described in French patent 1,492,597 and in particular include the polymers sold under the names "JR" (JR 400, JR 125, JR 30M) or "LR" (LR 400, LR 30M) by the company Dow. These polymers are also defined in the CTFA dictionary as hydroxyethylcellulose quaternary ammoniums that have reacted with an epoxide substituted with a trimethylammonium group.

The cationic cellulose copolymers or the celluloses grafted with a water-soluble quaternary ammonium monomer are described especially in patent U.S. Pat. No. 4,131,576, such as hydroxyalkylcelluloses, for instance hydroxymethyl-, hydroxyethyl- or hydroxypropylcelluloses grafted especially with a methacryloyl-ethyltrimethylammonium, methacrylamidopropyltrimethylammonium or dimethyl-diallylammonium salt. The commercial products corresponding to this definition are more particularly the products sold under the names Celquat® L 200 and Celquat® H 100 by the company Akzo Nobel.

Cationic starches suitable for the present invention include the products sold under Polygelo® (cationic starches from Sigma), the products sold under Softgel®, Amylofax® and Solvitose® (cationic starches from Avebe).

In one embodiment, the cationic polysaccharide is a cationic guar. Guars are polysaccharides composed of the sugars galactose and mannose. The backbone is a linear chain of β 1,4-linked mannose residues to which galactose residues are 1,6-linked at every second mannose, forming short side-branches. Within the context of the present invention, the cationic guars are cationic derivatives of guars.

In the case of the cationic polysaccharide, such as the cationic guar, the cationic group may be a quaternary ammonium group bearing 3 radicals, which may be identical or different, preferably chosen from hydrogen, alkyl, hydroxyalkyl, epoxyalkyl, alkenyl, or aryl, preferably containing 1 to 22 carbon atoms, more particularly 1 to 14 and advantageously 1 to 3 carbon atoms. The counterion is generally a halogen. One example of the halogen is chlorine.

Examples of the quaternary ammonium group include: 3-chloro-2-hydroxypropyl trimethyl ammonium chloride (CHPTMAC), 2,3-epoxypropyl trimethyl ammonium chloride (EPTAC), diallyldimethyl ammonium chloride (DMDAAC), vinylbenzene trimethyl ammonium chloride, trimethylammonium ethyl metacrylate chloride, methacrylamidopropyltrimethyl ammonium chloride (MAPTAC), and tetraalkylammonium chloride.

One example of the cationic functional group in the cationic polysaccharides, such as the cationic guars, is trimethylamino(2-hydroxyl)propyl, with a counter ion. Various counter ions can be utilized, including but not limited to halides, such as chloride, fluoride, bromide, and iodide, sulfate, notrate, methylsulfate, and mixtures thereof.

The cationic guars of the present invention may be chosen from the group consisting of:

cationic hydroxyalkyl guars, such as cationic hydroxyethyl guar, cationic hydroxypropyl guar, cationic hydroxybutyl guar, and cationic carboxylalkyl guars including cationic carboxymethyl guar, cationic alkylcarboxy guars such as cationic carboxylpropyl guar and cationic carboxybutyl guar, cationic carboxymethylhydroxypropyl guar.

In one embodiment, the cationic guars of the present invention are guars hydroxypropyltrimonium chloride or hydroxypropyl guar hydroxypropyltrimonium chloride.

The cationic polysaccharide, such as the cationic guars, of the present invention may have an average Molecular Weight (Mw) of between 100,000 daltons and 3,500,000 daltons, preferably between 100,000 daltons and 1,500,000 daltons, more preferably between 100,000 daltons and 1,000,000 daltons.

In the context of the present application, the term "Degree of Substitution (DS)" of cationic polysaccharides, such as cationic guars, is the average number of hydroxyl groups substituted per sugar unit. DS may be determined by titration.

In one embodiment, the DS of the cationic polysaccharide, such as the cationic guar, is in the range of 0.01 to 1. In another embodiment, the DS of the cationic polysaccharide, such as the cationic guar, is in the range of 0.05 to 1. In still another embodiment, the DS of the cationic polysaccharide, such as the cationic guar, is in the range of 0.05 to 0.2.

In the context of the present application, "Charge Density (CD)" of cationic polysaccharides, such as cationic guars, means the ratio of the number of positive charges on a monomeric unit of which a polymer is comprised to the molecular weight of said monomeric unit.

In one embodiment, the CD of the cationic polysaccharide, such as the cationic guar, is in the range of 0.1 to 3 (meq/gm). In another embodiment, the CD of the cationic polysaccharide, such as the cationic guar, is in the range of 0.1 to 2 (meq/gm). In still another embodiment, the CD of the cationic polysaccharide, such as the cationic guar, is in the range of 0.1 to 1 (meq/gm).

B: Nonionic Polysaccharide

The nonionic polysaccharide may be a modified nonionic polysaccharide or a non-modified nonionic polysaccharide. The modified nonionic polysaccharide may comprise hydroxyalkylations. In the context of the present application, the degree of hydroxyalkylation (molar substitution or MS) of the modified nonionic polysaccharides means the number of alkylene oxide molecules consumed by the number of free hydroxyl functions present on the polysaccharides. In one embodiment, the MS of the modified nonionic polysaccharide is in the range of 0 to 3. In another embodiment, the MS of the modified nonionic polysaccharide is in the range of 0.1 to 3. In still another embodiment, the MS of the modified nonionic polysaccharide is in the range of 0.1 to 2.

The nonionic polysaccharide of the present invention may be especially chosen from glucans, modified or non-modified starches (such as those derived, for example, from cereals, for instance wheat, corn or rice, from vegetables, for instance yellow pea, and tubers, for instance potato or cassava), amylose, amylopectin, glycogen, dextrans, celluloses and derivatives thereof (methylcelluloses, hydroxyalkylcelluloses, ethylhydroxyethylcelluloses), mannans, xylans, lignins, arabans, galactans, galacturonans, chitin, chitosans, glucuronoxylans, arabinoxylans, xyloglucans, glucomannans, pectic acids and pectins, arabinogalactans, carrageenans, agars, gum arabics, gum tragacanths, ghatti gums, karaya gums, carob gums, galactomannans such as guars and nonionic derivatives thereof (hydroxypropyl guar), and mixtures thereof.

Among the celluloses that are especially used are hydroxyethylcelluloses and hydroxypropylcelluloses. Mention may be made of the products sold under the names Klucel® EF, Klucel® H, Klucel® LHF, Klucel® MF and Klucel® G by the company Aqualon, and Cellosize® Polymer PCG-10 by the company Amerchol.

In one embodiment, the nonionic polysaccharide is a nonionic guar. The nonionic guar may be modified or non-modified. The non-modified nonionic guars include the products sold under the name Vidogum® GH 175 by the company Unipectine and under the names Mepro®-Guar 50 and Jaguar® C by the company Solvay. The modified nonionic guars are especially modified with $C_1$-$C_6$ hydroxyalkyl groups. Among the hydroxyalkyl groups that may be mentioned, for example, are hydroxymethyl, hydroxyethyl, hydroxypropyl and hydroxybutyl groups. These guars are well known in the prior art and can be prepared, for example, by reacting the corresponding alkene oxides such as, for example, propylene oxides, with the guar so as to obtain a guar modified with hydroxypropyl groups.

The nonionic polysaccharide, such as the nonionic guar, of the present invention may have an average Molecular Weight (Mw) of between 100,000 daltons and 3,500,000 daltons, preferably between 500,000 daltons and 3,500,000 daltons.

C: Amphoteric Polysaccharide

Suitable amphoteric polysaccharide may be a polysaccharide derivative containing both a cationic and an anionic substituent. The polysaccharide backbone may be any of the native or natural polysaccharide polymers obtained from plant, animal and microbial sources, for instance guar, cellulose, starch and the derivatives thereof.

The amphoteric polysaccharides are derivatized or modified to contain a cationic group or substituent. The substituted polysaccharides are formed by the derivatization of the hydroxyl functionality of the polysaccharide. The cationic group may be an amino, ammonium, imino, sulfonium or phosphonium group. Such cationic derivatives include those containing nitrogen containing groups comprising primary, secondary, tertiary and quaternary amines and sulfonium and phosphonium groups attached through either ether or ester linkages. The preferred cationic derivatives are those containing the tertiary amino and quaternary ammonium ether groups.

The cationic derivatives as described herein may be produced by known methods as disclosed for example in "Cationic Starches", by D. B. Solarek in Modified Starches: Properties and Uses, Chapter 8, 1986 and in U.S. Pat. No. 4,119,487 issued Oct. 10, 1978 to M. Tessler. The method for preparing polysaccharides such as starch or guar containing tertiary amino groups involves reacting the polysaccharide under alkaline conditions with a dialkylaminoalkyl halide as described in U.S. Pat. No. 2,813,093 issued on Nov. 12, 1957 to C. Caldwell et al. The primary and secondary amine derivatives may be prepared by reacting the polysaccharide with aminoalkyl anhydrides, amino epoxides or halides, or the corresponding compounds containing aryl in addition to the alkyl groups.

Quaternary ammonium groups may be introduced into the polysaccharide backbone (such as a guar backbone) by treatment with the reaction product of an epihalohydrin and a tertiary amine or tertiary amine salt to provide, for example, 2-hydroxypropyl ether substituent groups as disclosed in the noted U.S. Pat. No. 4,119,487. They may also be introduced into the guar backbone by suitable treatment of guar with etherifying agents known in the art.

Particularly useful cationic derivatives are those containing amino or nitrogen groups having alkyl, aryl, alkaryl, or cyclic substituents of 1 to 22 carbon atoms and especially alkyl of 1 to 6 carbon atoms.

The polysaccharide used in this invention will also be derivatized with an anionic group or substituent. This anionic group may be a carboxyl, sulfonate, sulfate, phosphate or phosphonate group, preferably a carboxyl group. The introduction of these groups may be achieved by various known methods.

The carboxyl group may be introduced into the polysaccharide by reacting the water-dispersible polysaccharide in the presence of an alkaline catalyst and a mono halogen substituted acid such as monochloro acetic acid, acrylic acid, acrylamide followed by hydrolysis of the amide group and acrylonitrile followed by hydrolysis of the cyanoethyl groups. Carboxyl groups may also be provided by oxidation such as reaction with sodium periodate followed by treatment with sodium chlorite to transform the carbonyl groups to carboxyl groups.

Sulfonate groups can be introduced by reaction with reagents containing functional groups such as sultones, sodium salt of halo alkane sulfonic acids, chloropropane sulfonic acid, epoxypropane sulfonic acid and ethene sulfonic acid. Sulfonate groups may also be introduced by oxidation such as by reaction with sodium periodate followed by treatment with potassium bisulphite. Sulfate groups can be introduced, e.g., with addition products of sulfur trioxide and a tertiary amine, or treatment with sulfamic acid and/or sulfuric acid and urea.

Phosphate groups can be added to the polysaccharide by known techniques such as phosphorylation with alkali metal phosphate salts.

The preferred amphoteric derivatives are those containing carboxyl groups as the anionic substituent and more particularly those containing carboxyalkyl groups having from 2 to 6 carbon atoms. The carboxyalkyl ether derivatives are particularly useful and they may be obtained by the reaction of the polysaccharide such as guar with a halo alkyl acid containing 2 to 6 carbon atoms or the alkali metal salt thereof. The reaction is carried out using an aqueous alcohol slurry with an alkali metal hydroxide catalyst such as sodium hydroxide. Acids and salts that can be used include monochloroacetic acid and sodium chloroacetate.

The introduction of the anionic and cationic substituents may be carried out either sequentially or simultaneously and the method chosen may depend on the particular reactants, the amount of substituents desired and the method used.

The solid composition of the present invention may comprise more than one polysaccharides. The more than one polysaccharides comprised in the solid composition can be selected from cationic polysaccharides, nonionic polysaccharides, ampholytic polysaccharides or combination thereof. In one embodiment, the solid composition comprises a cationic polysaccharide and a nonionic polysaccharide. In another embodiment, the solid composition comprises a cationic guar and a nonionic guar.

Hydrophobic Compound

The solid composition of the present invention comprises a hydrophobic compound having a melting point of between 30° C. and 90° C. Preferably, the solid composition of the present invention comprises a hydrophobic compound having a melting point of between 45° C. and 90° C. Preferably, the hydrophobic compound is an organic hydrophobic compound.

Hydrophobic compounds do not cause gellification of polysaccharides thus the two components can be well compatible in the solid composition. Suitable hydrophobic compounds include natural and synthetic waxes. Waxes are generally organic compounds which are in solid form at the ambient temperature and have melting point above 45° C., preferably between 45° C. and 90° C. Waxes are insoluble in water but soluble in organic, nonpolar solvents.

Suitable solidification agents include natural and synthetic waxes. Natural waxes may include, for example, one or a combination of animal, vegetable/plant, mineral, or petroleum derived waxes. They are typically esters of fatty acids and long chain alcohols. Wax esters are derived from a variety of carboxylic acids and a variety of fatty alcohols. The waxes of the present disclosure may also be known as solid lipids.

Examples of natural waxes include, but are not limited to, beeswax, hydrogenated alkyl olive esters, carnauba wax, candelilla wax, ouricoury wax, Japan wax, cork fibre wax or sugar cane wax, rice wax, montan wax, paraffin wax, lignite wax or microcrystalline wax, ceresin or ozokerite, palm kernel glycerides/hydrogenated palm glycerides and hydrogenated oils such as hydrogenated castor oil or jojoba oil, sugarcane, retamo, bayberry, rice bran, soy, castor, esparto, Japan waxes, Chinese wax, lanolin, shellac, and spermaceti. Examples of synthetic waxes include, but are not limited to, those of the hydrocarbon type, such as paraffin wax, and polyethylene waxes obtained from the polymerization or copolymerization of ethylene, and Fischer-Tropsch® waxes, or else esters of fatty acids, such as octacosanyl stearate, cetyl palmitate, hydroxyoctacosanyl hydroxystearate, glycerides which are solid at temperatures of 35° C., such as glyceryl stearate, ether of fatty alcohol, such as steareth-2, silicone waxes, such as alkyl- or alkoxydimethicones having an alkyl or alkoxy chain ranging from 10 to 45 carbon atoms, poly(di)methylsiloxane esters whose ester chain comprising at least 10 carbon atoms, and di(1,1,1-trimethylolpropane) tetrastearate, which is sold or manufactured by Heterene under the name HEST® 2T-4S, and mixtures thereof.

Other examples of waxes or solid lipids include $C_{10}$-$C_{40}$ fatty alcohols, such as cetyl alcohol, $C_{10}$-$C_{40}$ fatty acids, $C_{10}$-$C_{40}$ fatty amines and their compounds, and sterols.

By way of non-limiting example only, the wax may, in various embodiments, advantageously be chosen from beeswax, commercially available from various suppliers, hydrogenated stearyl olive ester, and commercially available from the supplier Sophim under the tradename, Phytowax Olive 18 L 57, hydrogenated myristyl olive ester, and commercially available from the supplier Sophim under the tradename, Phytowax Olive 14 L 48, VP/eicosene copolymer, commercially available from the supplier ISP under the tradenames, Antaron® V 220 or Ganex® V 220F, and ditrimethyloylpropane tetrastearate, commercially available from the supplier Heterene under the tradename, HEST 2T-4S.

Other suitable waxes include silsesquioxane resin waxes such as $C_{30}$-$C_{45}$ alkyldimethylsilyl propylsilsesquioxane, commercially available as DOW CORNING SW-8005 $C_{30}$ Resin Wax, from the company Dow Corning and such as those described in WO2005/100444.

The solid composition as described herein may be prepared by melting the hydrophobic compound by heating it to a temperature beyond its melting point. Then the polysaccharide may be mixed with the molten hydrophobic compound in a mixer, preferably with heating and agitation. After the components form a homogenous mixture, the mixture may be solidified by cooling so as to obtain the solid composition. It is appreciated that the polysaccharide may also be mixed with the hydrophobic compound which is still in a solid form, then the mixture may be melt, by heating, to allow the mixing of the components, preferably with heating and agitation. Subsequently, the resulting mixture may be solidified by cooling to obtain the solid composition.

In one embodiment, the hydrophobic compound is present in an amount between 50 wt % and 99 wt % based on the total weight of the solid composition.

Preferably, the solid composition of the present invention is substantially free or completely free of water. As used herein, the term "substantially free" when used with reference to the absence of water in the composition of the present invention, means that the composition comprises less than 0.1 wt % of water, more preferably less than 0.01 wt % of water, based on the total weight of the composition. As used herein, the term "completely free" when used with reference to the absence of water (ie. 0 wt % of water) in the composition of the present invention, means that the composition comprises no water at all.

In another aspect of the present invention, the solid composition further comprises a quaternary ammonium compound.

Quaternary Ammonium Compound

Suitable quaternary ammonium compound (also referred to as "quat") may be a compound of the general formula (I):

$$[N^+(R_1)(R_2)(R_3)(R_4)]_y X^-\qquad\qquad(I)$$

wherein:

$R_1$, $R_2$, $R_3$ and $R_4$, which may be the same or different, is a $C_1$-$C_{30}$ hydrocarbon group, typically an alkyl, hydroxyalkyl or ethoxylated alkyl group, optionally containing a heteroatom or an ester or amide group;

X is an anion, for example halide, such as Cl or Br, sulphate, alkyl sulphate, nitrate or acetate;

y is the valence of X.

In one embodiment, at least one of $R_1$, $R_2$, $R_3$ and $R_4$ contains an ester linkage group (ester link). In another embodiment, at least two of $R_1$, $R_2$, $R_3$ and $R_4$ contain an ester link.

The quat may be a compound of general formula (II):

$$[N^+(R_5)_2(R_6)(R_7)]_y X^-\qquad\qquad(II)$$

wherein:

$R_5$ is an aliphatic $C_1$-$C_{30}$ group; preferably $R_5$ contains an ester link;

$R_6$ is a $C_1$-$C_4$ alkyl group;

$R_7$ is $R_5$ or $R_6$;

X is an anion, for example halide, such as Cl or Br, sulphate, alkyl sulphate, nitrate or acetate;

y is the valence of X.

The quat is preferably di-(hardened tallow) dimethyl ammonium chloride.

In aspects where the solid composition is used as, or used for preparing, a fabric conditioning composition, the quat is preferably an ester quat. in one embodiment, the ester quat is a compound of general formula (III):

$$[N^+((CH_2)_n T\text{-}R_8)_2(R_8)(R_9)]_y X^-\qquad\qquad(III)$$

wherein:

$R_9$ group is independently selected from $C_1$-$C_4$ alkyl or hydroxylalkyl group;

$R_8$ group is independently selected from $C_1$-$C_{30}$ alkyl or alkenyl group;

T is —C(=O)—O— or —O—C(=O)—;

n is an integer from 0 to 5;

X is an anion, for example a chloride, bromide, nitrate or methosulphate ion;

y is the valence of X.

In another embodiment, the ester quaternary ammonium compound comprises two $C_{12-28}$ alkyl or alkenyl groups connected to the nitrogen head group, more preferably via at least one ester link. In another embodiment, the quaternary ammonium compound has two ester links present.

Preferably, the average chain length of the alkyl or alkenyl group is at least $C_{14}$, more preferably at least $C_{16}$. Even more preferably at least half of the chains have a length of $C_{18}$.

The fatty acid chains of the ester quat may comprise from 20 to 35 weight percent of saturated $C_{18}$ chains and from 20 to 35 weight percent of monounsaturated $C_{18}$ chains by weight of total fatty acid chains. Preferably, the ester quat is derived from palm or tallow feedstocks. These feedstocks may be pure or predominantly palm or tallow based. Blends of different feedstocks may be used.

In one embodiment, the fatty acid chains of the ester quat comprise from 25 to 30 weight percent, preferably from 26 to 28 weight percent of saturated $C_{18}$ chains and from 25 to 30 weight percent, preferably from 26 to 28 weight percent of monounsaturated $C_{18}$ chains, by weight of total fatty acid chains.

In another embodiment, the fatty acid chains of the ester quat comprise from 30 to 35 weight percent, preferably from 33 to 35 weight percent of saturated $C_{18}$ chains and from 24 to 35 weight percent, preferably from 27 to 32 weight percent of monounsaturated $C_{18}$ chains, by weight of total fatty acid chains.

In still another embodiment, the alkyl or alkenyl chains are predominantly linear, although a degree of branching, especially mid-chain branching, is within the scope of the invention.

In still another embodiment, the ester quat is triethanolamine-based quat of general formula (IV):

$$N^+(C_2H_4\text{—}OOCR_{10})_2(CH_3)(C_2H_4\text{—}OH)(CH_3)_zSO_4^-\qquad(IV)$$

wherein $R_{10}$ is a $C_{12}$-$C_{20}$ alkyl group;

z is an integer from 1 to 3.

Preferred ester quaternary ammonium compounds of the present invention include:

TET: Di(tallowcarboxyethyl)hydroxyethyl methyl ammonium methylsulfate,

TEO: Di(oleocarboxyethyl)hydroxyethyl methyl ammonium methylsulfate,

TES: Distearyl hydroxyethyl methyl ammonium methylsulfate,

TEHT: Di(hydrogenated tallow-carboxyethyl)hydroxyethyl methyl ammonium methylsulfate, TEP: Di(palmiticcarboxyethyl)hydroxyethyl methyl ammonium methylsulfate, DEEDMAC: Dimethylbis[2-[(1-oxooctadecyl)oxy]ethyl] ammonium chloride, DHT: Dihydrogenated tallowdimethylammonium chloride.

Certain quaternary ammonium compounds have relatively low melting point, for example, the melting point may be lower than 35° C., or even be lower than 25° C. When such quaternary ammonium compounds are present along with a polysaccharide in a solid composition, the solid composition may not be stable and the quat component and the polysaccharide component may undergo phase separation when the solid composition is exposed to high temperatures.

According to the present invention, in embodiments wherein the solid composition comprises a quaternary ammonium compound, the weight ratio of the polysaccharide and the hydrophobic compound should be in a range sufficient to stabilize the composition in a solid form under the ambient temperature or higher temperatures. In one embodiment, the weight ratio of the polysaccharide and the hydrophobic compound is between 1:50 and 50:1. In another embodiment, the weight ratio of the polysaccharide and the hydrophobic compound is between 1:30 and 30:1. In still another embodiment, the weight ratio of the polysaccharide and the hydrophobic compound is between 1:10 and 10:1. It has been found that the resulting solid composition can remain stable solid at a temperature up to 45° C. and no phase separation of the quaternary ammonium compound component and the polysaccharide component occurs at such temperatures. In particular, the solid composition can remain stable solid even when the polysaccharide is present in the solid composition at a low percentage, such as below 5 wt %.

In embodiments wherein the solid composition comprises a quaternary ammonium compound, the solid composition may comprise 0.5 wt % or above of the polysaccharide based on the total weight of the solid composition. Preferably, the solid composition comprises 1 wt % or above of the polysaccharide based on the total weight of the solid composition. More preferably, the solid composition comprises 5 wt % or above of the polysaccharide based on the total weight of the solid composition.

In embodiments wherein the solid composition comprises a quaternary ammonium compound, the total weight of the polysaccharide and the hydrophobic compound is preferably at least 10 wt % of the total weight of the solid composition, more preferably, the total weight of the polysaccharide and the hydrophobic compound is at least 20 wt % of the total weight of the solid composition, even more preferably, the total weight of the polysaccharide and the hydrophobic compound is at least 40 wt % of the total weight of the solid composition.

Optional Components

The solid composition of the present invention may also comprise optional components, preferably, selected from those that are not sensitive to heating and shearing. In the event that the optional components are sensitive to heating or shearing, such components are preferably added to a liquid composition prepared by using the solid composition of the present invention as described hereafter. The optional components include and are not limited to those described below.

The solid composition may comprise a silicone compound. The silicone compound of the invention can be a linear or branched structured silicone polymer. The silicone of the present invention can be a single polymer or a mixture of polymers. Suitable silicone compounds include polyalkyl silicone, amonosilicone, siloxane, polydimethyl siloxane, ethoxylated organosilicone, propoxylated organosilicone, ethoxylated/propoxylated organosilicone and mixture thereof. Suitable silicones include but are not limited to those available from Wacker Chemical, such as Wacker® FC 201 and Wacker® FC 205.

The solid composition may comprise a cross-linking agent. Following is a non-restrictive list of cross-linking agents: methylene bisacrylamide (MBA), ethylene glycol diacrylate, polyethylene glycol dimethacrylate, diacrylamide, triallylamine, cyanomethylacrylate, vinyl oxyethylacrylate or methacrylate and formaldehyde, glyoxal, compounds of the glycidyl ether type such as ethyleneglycol diglycidyl ether, or the epoxydes or any other means familiar to the expert permitting cross-linking.

The solid composition may comprise at least one surfactant system. A variety of surfactants can be used in the solid composition of the invention, including cationic, nonionic and/or amphoteric surfactants, which are commercially available from a number of sources. For a discussion of surfactants, see Kirk-Othmer, Encyclopedia of Chemical Technology, Third Edition, volume 8, pages 900-912. Preferably, the solid composition comprises a surfactant system in an amount effective to provide a desired level of softness to fabrics while still maintaining a solid form, preferably between about 5 and about 10 wt %.

The solid composition may comprise a dye, such as an acid dye, a hydrophobic dye, a basic dye, a reactive dye, a dye conjugate. Suitable acid dyes include azine dyes such as acid blue 98, acid violet 50, and acid blue 59, non-azine acid dyes such as acid violet 17, acid black 1 and acid blue 29. Hydrophobic dyes selected from benzodifuranes, methine, triphenylmethanes, napthalimides, pyrazole, napthoquinone, anthraquinone and mono-azo or di-azo dye chromophores. Suitable hydrophobic dyes are those dyes which do not contain any charged water solubilising group. The hydrophobic dyes may be selected from the groups of disperse and solvent dyes. Blue and violet anthraquinone and mono-azo dye are preferred. Basic dyes are organic dyes which carry a net positive charge. They deposit onto cotton. They are of particular utility for used in composition that contain predominantly cationic surfactants. Dyes may be selected from the basic violet and basic blue dyes listed in the Colour Index International. Preferred examples include triarylmethane basic dyes, methane basic dye, anthraquinone basic dyes, basic blue 16, basic blue 65, basic blue 66, basic blue 67, basic blue 71, basic blue 159, basic violet 19, basic violet 35, basic violet 38, basic violet 48; basic blue 3, basic blue 75, basic blue 95, basic blue 122, basic blue 124, basic blue 141. Reactive dyes are dyes which contain an organic group capable of reacting with cellulose and linking the dye to cellulose with a covalent bond. Preferably the reactive group is hydrolysed or reactive group of the dyes has been reacted with an organic species such as a polymer, so as to the link the dye to this species. Dyes may be selected from the reactive violet and reactive blue dyes listed in the Colour Index International. Preferred examples include reactive blue 19, reactive blue 163, reactive blue 182 and reactive blue, reactive blue 96. Dye conjugates are formed by binding direct, acid or basic dyes to polymers or particles via physical forces. Dependent on the choice of polymer or particle they deposit on cotton or synthetics. A description is given in WO2006/055787. Particularly preferred dyes are: direct violet 7, direct violet 9, direct violet 11, direct violet 26, direct violet 31, direct violet 35, direct violet 40, direct violet 41, direct violet 51, direct violet 99, acid blue 98, acid violet 50, acid blue 59, acid violet 17, acid black 1, acid blue 29, solvent violet 13, disperse violet 27 disperse violet 26, disperse violet 28, disperse violet 63, disperse violet 77 and mixtures thereof. The solid composition of the present invention may comprise one or more perfumes. The perfume is preferably present in an amount between 0.01 and 20 wt %, more preferably between 0.05 and 10 wt %, even more preferably between 0.05 and 5 wt %, most preferably between 0.05 and 1.5 wt %, based on the total weight of the solid composition.

Useful components of the perfume include materials of both natural and synthetic origin. They include single compounds and mixtures. Specific examples of such components may be found in the current literature, e.g., in Fenaroli's Handbook of Flavor Ingredients, 1975, CRC Press; Synthetic Food Adjuncts, 1947 by M. B. Jacobs, edited by Van Nostrand; or Perfume and Flavor Chemicals by S. Arctander 1969, Montclair, N.J. (USA). These substances are well known to the person skilled in the art of perfuming, flavouring, and/or aromatizing consumer products, i.e., of imparting an odour and/or a flavour or taste to a consumer product traditionally perfumed or flavoured, or of modifying the odour and/or taste of said consumer product.

By perfume in this context is not only meant a fully formulated product fragrance, but also selected components of that fragrance, particularly those which are prone to loss, such as the so-called 'top notes'. Top notes are defined by Poucher (Journal of the Society of Cosmetic Chemists 6(2):80 [1955]). Examples of well known top-notes include citrus oils, linalool, linalyl acetate, lavender, dihydromyrcenol, rose oxide and cis-3-hexanol.

Some or all of the perfume or pro-fragrance may be encapsulated, typical perfume components which it is advantageous to encapsulate, include those with a relatively low boiling point. It is also advantageous to encapsulate perfume components which have a low Clog P (i.e. those which will be partitioned into water), preferably with a Clog P of less than 3.0. As used herein, the term "Clog P" means the calculated logarithm to base 10 of the octanol/water partition coefficient (P). These materials, of relatively low boiling point and relatively low Clog P have been called the "delayed blooming" perfume ingredients and include the following materials:

Allyl Caproate, Amyl Acetate, Amyl Propionate, Anisic Aldehyde, Anisole, Benzaldehyde, Benzyl Acetate, Benzyl Acetone, Benzyl Alcohol, Benzyl Formate, Benzyl Iso Valerate, Benzyl Propionate, Beta Gamma Hexenol, Camphor Gum, Laevo-Carvone, d-Carvone, Cinnamic Alcohol, Cinamyl Formate, Cis-Jasmone, cis-3-Hexenyl Acetate, Cuminic Alcohol, Cyclal C, Dimethyl Benzyl Carbinol, Dimethyl Benzyl Carbinol Acetate, Ethyl Acetate, Ethyl Aceto Acetate, Ethyl Amyl Ketone, Ethyl Benzoate, Ethyl Butyrate, Ethyl Hexyl Ketone, Ethyl Phenyl Acetate, Eucalyptol, Eugenol, Fenchyl Acetate, Flor Acetate (tricyclo Decenyl Acetate), Frutene (tricycico Decenyl Propionate), Geraniol, Hexenol, Hexenyl Acetate, Hexyl Acetate, Hexyl Formate, Hydratropic Alcohol, Hydroxycitronellal, Indone, Isoamyl Alcohol, Iso Menthone, Isopulegyl Acetate, Isoquinolone, Ligustral, Linalool, Linalool Oxide, Linalyl Formate, Menthone, Menthyl Acetphenone, Methyl Amyl Ketone, Methyl Anthranilate, Methyl Benzoate, Methyl Benzyl Acetate, Methyl Eugenol, Methyl Heptenone, Methyl Heptine Carbonate, Methyl Heptyl Ketone, Methyl Hexyl Ketone, Methyl Phenyl Carbinyl Acetate, Methyl Salicylate, Methyl-N-Methyl Anthranilate, Nerol, Octalactone, Octyl Alcohol, p-Cresol, p-Cresol Methyl Ether, p-Methoxy Acetophenone, p-Methyl Acetophenone, Phenoxy Ethanol, Phenyl Acetaldehyde, Phenyl Ethyl Acetate, Phenyl Ethyl Alcohol, Phenyl Ethyl Dimethyl Carbinol, Prenyl Acetate, Propyl Bornate, Pulegone, Rose Oxide, Safrole, 4-Terpinenol, Alpha-Terpinenol, and/or Viridine. Preferred non-encapsulated perfume ingredients are those hydrophobic perfume components with a Clog P above 3. Perfume components with a Clog P above 3 comprise: Iso E super, citronellol, Ethyl cinnamate, Bangalol, 2,4,6-Trimethylbenzaldehyde, Hexyl cinnamic aldehyde, 2,6-Dimethyl-2-heptanol, Diisobutylcarbinol, Ethyl salicylate, Phenethyl isobutyrate, Ethyl hexyl ketone, Propyl amyl ketone, Dibutyl ketone, Heptyl methyl ketone, 4,5-Dihydrotoluene, Caprylic aldehyde, Citral, Geranial, Isopropyl benzoate, Cyclohexanepropionic acid, Campholene aldehyde, Caprylic acid, Caprylic alcohol, Cuminaldehyde, 1-Ethyl-4-nitrobenzene, Heptyl formate, 4-Isopropylphenol, 2-Isopropylphenol, 3-Isopropylphenol, Allyl disulfide, 4-Methyl-1-phenyl-2-pentanone, 2-Propylfuran, Allyl caproate, Styrene, Isoeugenyl methyl ether, Indonaphthene, Diethyl suberate, L-Menthone, Menthone racemic, p-Cresyl isobutyrate, Butyl butyrate, Ethyl hexanoate, Propyl valerate, n-Pentyl propanoate, Hexyl acetate, Methyl heptanoate, trans-3,3,5-Trimethylcyclohexanol, 3,3,5-Trimethylcyclohexanol, Ethyl p-anisate, 2-Ethyl-1-hexanol, Benzyl isobutyrate, 2,5-Dimethylthiophene, Isobutyl 2-butenoate, Caprylnitrile, gamma-Nonalactone, Nerol, trans-Geraniol, 1-Vinylheptanol, Eucalyptol, 4-Terpinenol, Dihydrocarveol, Ethyl 2-methoxybenzoate, Ethyl cyclohexanecarboxylate, 2-Ethylhexanal, Ethyl amyl carbinol, 2-Octanol, 2-Octanol, Ethyl methylphenylglycidate, Diisobutyl ketone, Coumarone, Propyl isovalerate, Isobutyl butanoate, Isopentyl propanoate, 2-Ethylbutyl acetate, 6-Methyl-tetrahydroquinoline, Eugenyl methyl ether, Ethyl dihydrocinnamate, 3,5-Dimethoxytoluene, Toluene, Ethyl benzoate, n-Butyrophenone, alpha-Terpineol, Methyl 2-methylbenzoate, Methyl 4-methylbenzoate, Methyl 3, methylbenzoate, sec. Butyl n-butyrate, 1,4-Cineole, Fenchyl alcohol, Pinanol, cis-2-Pinanol, 2,4, Dimethylacetophenone, Isoeugenol, Safrole, Methyl 2-octynoate, o-Methylanisole, p-Cresyl methyl ether, Ethyl anthranilate, Linalool, Phenyl butyrate, Ethylene glycol dibutyrate, Diethyl phthalate, Phenyl mercaptan, Cumic alcohol, m-Toluquinoline, 6-Methylquinoline, Lepidine, 2-Ethylbenzaldehyde, 4-Ethylbenzaldehyde, o-Ethylphenol, p-Ethylphenol, m-Ethylphenol, (+)-Pulegone, 2,4-Dimethylbenzaldehyde, Isoxylaldehyde, Ethyl sorbate, Benzyl propionate, 1,3-Dimethylbutyl acetate, Isobutyl isobutanoate, 2,6-Xylenol, 2,4-Xylenol, 2,5-Xylenol, 3,5-Xylenol, Methyl cinnamate, Hexyl methyl ether, Benzyl ethyl ether, Methyl salicylate, Butyl propyl ketone, Ethyl amyl ketone, Hexyl methyl ketone, 2,3-Xylenol, 3,4, Xylenol, Cyclopentadenanolide and Phenyl ethyl 2 phenylacetate 2. It is commonplace for a plurality of perfume components to be present in a formulation. Another group of perfumes with which the present invention can be applied are the so-called 'aromatherapy' materials. These include many components also used in perfumery, including components of essential oils such as Clary Sage, Eucalyptus, Geranium, Lavender, Mace Extract, Neroli, Nutmeg, Spearmint, Sweet Violet Leaf and Valerian.

The solid composition may comprise an antimicrobial. The antimicrobial may be a halogenated material. Suitable halogenated materials include 5-chloro-2-(2,4-dichlorophenoxy)phenol, o-Benzyl-p-chloro-phenol, and 4-chloro-3-methylphenol. Alternatively The antimicrobial may be a non-halogenated material. Suitable non-halogenated materials include 2-Phenylphenol and 2-(1-Hydroxy-1-methylethyl)-5-methylcyclohexanol. Phenyl ethers are one preferred sub-set of the antimicrobials. The antimicrobial may also be a bi-halogenated compound. Most preferably this comprises 4-4' dichloro-2-hydroxy diphenyl ether, and/or 2,2-dibromo-3-nitrilopropionamide (DBNPA).

The solid composition of the present invention may also comprise preservatives. Preferably only those preservatives that have no, or only slight, skin sensitizing potential are used. Examples are phenoxy ethanol, 3-iodo-2-propynylbutyl carbamate, sodium N-(hydroxymethyl)glycinate, biphenyl-2-ol as well as mixtures thereof.

The solid composition may also comprise antioxidants to prevent undesirable changes caused by oxygen and other oxidative processes to the solid composition and/or to the treated textile fabrics. This class of compounds includes, for example, substituted phenols, hydroquinones, pyrocatechols, aromatic amines and vitamin E.

The solid composition may also comprise one or more of the following optional components: dispersing agents, stabilizers, colorants, brighteners, dyes, odor control agent, cyclodextrins, soil release polymers, chlorine scavengers, anti-shrinkage agents, fabric crisping agents, spotting agents, anti-corrosion agents, bodying agents, drape and form control agents, smoothness agents, static control agents, wrinkle control agents, sanitization agents, disinfecting agents, germ control agents, mold control agents, mildew control agents, antiviral agents, drying agents, stain resistance agents, malodor control agents, fabric refreshing agents, chlorine bleach odor control agents, dye fixatives, dye transfer inhibitors, color maintenance agents, color restoration/rejuvenation agents, anti-fading agents, whiteness enhancers, anti-abrasion agents, wear resistance agents, fabric integrity agents, anti-wear agents, defoamers and anti-foaming agents, rinse aids, UV protection agents, sun fade inhibitors, insect repellents, anti-allergenic agents, enzymes, flame retardants, water proofing agents, fabric comfort agents, shrinkage resistance agents, stretch resistance agents, and mixtures thereof.

Preferably, the solid composition of the present invention does not comprise any carrier material. "Carrier material" means a material, generally in a particulate form, which is used for carrying the active ingredient, wherein the active ingredient is substantially coated on the surface of the carrier material. One example of the carrier material is an inorganic salt particle. One advantage of not including any carrier material in the solid composition is that the solid composition may comprise a higher percentage of active ingredients, such as the quaternary ammonium compound and the polysaccharide. Another advantage is that the solid composition of the present invention is easier to prepare compared to those which requires a carrier material.

In another aspect of the present invention, there is provided a process for preparing a solid composition comprising the steps of:

(i) providing a quaternary ammonium compound in liquid form;

(ii) combining a polysaccharide, a hydrophobic compound having a melting point of between 30° C. and 90° C. with the quaternary ammonium compound to obtain a mixture;

(iii) solidifying the mixture;

wherein the weight ratio of the polysaccharide and hydrophobic compound is between 1:50 and 50:1.

The quaternary ammonium compound, the polysaccharide and the hydrophobic compound in the above process may be selected from those described herein.

In still another aspect of the present invention, there is provided a solid composition obtained by a process comprising the steps:

(i) providing a quaternary ammonium compound in liquid form;

(ii) combining a polysaccharide, a hydrophobic compound having a melting point of between 30° C. and 90° C. with the quaternary ammonium compound to obtain a mixture;

(iii) solidifying the mixture;

wherein the weight ratio of the polysaccharide and hydrophobic compound is between 1:50 and 50:1.

The process for preparing the solid composition comprises in step (i) providing a quaternary ammonium compound in liquid form. Preferably, the quaternary ammonium compound is substantially free or completely free of water.

In one embodiment, the quaternary ammonium compound may be molten by heating to a temperature above their melting point to obtain the quaternary ammonium compound in liquid form. The heating temperature may be in the range of 25° C. to 80° C., preferably in the range of 35° C. to 70° C. Preferably, the quaternary ammonium compound is heated with agitation. Some quaternary ammonium compounds are in liquid phase at the ambient temperature. In such case, the quaternary ammonium compounds may be directly employed for the process of the present invention, alternatively, the quaternary ammonium compounds may be heated to increase the viscosity so that the quaternary ammonium compounds become easier to be mixed with other components.

The process according to the present invention comprises in step (ii) combining a polysaccharide, a hydrophobic compound having a melting point of between 30° C. and 90° C. with the quaternary ammonium compound to obtain a mixture. In one embodiment, the polysaccharide and the hydrophobic compound may be added to the quaternary ammonium compound when the quaternary ammonium compound is partially or completely molten. In another embodiment, the polysaccharide and the hydrophobic compound may be mixed with the quaternary ammonium compound and then subject to heating. To facilitate mixing of the components, the mixing may be done while heating. Preferably, the mixing is done with heating and agitation. The agitation may be provided by stirring the mixture at 500 to 1000 rpm by using a suitable stirring device. The mixing may be stopped when the components are completely mixed and form a homogenous mixture. Generally, 10 to 30 mins are sufficient for complete mixing of the quaternary ammonium compound, the polysaccharide and the hydrophobic compound.

The optional components described hereabove may also be added to the mixture. These components may be added to the mixture in any desired order. Preferably, no water is added into the mixture during the process, and therefore, the mixture and the resulting solid composition is substantially free or completely free of water.

The mixing may be done in any suitable mixer, including but not limited to an open top stand mixer which is preferably used during bench-scale laboratory experiments. During scale-up for commercial purposes, a blender including, but not limited to, a vented, closed system blender is preferably used.

In one embodiment, a homogenization step may be provided after the mixing of the quaternary ammonium compound and the at least one polysaccharide so as to obtain a more stable and homogenous mixture. The homogenization step may employ a homogenization device commonly known in the art. The homogenization may be conducted at a speed of 3000 to 10000 rpm and the time for the homogenization may be 2 to 10 mins.

The process according to the present invention comprises in step (iii) solidifying the mixture.

The mixture obtained in step (ii) may be solidified, preferably by cooling the mixture below a temperature at which the mixture is solid. For example, the mixture may be cooled to the ambient temperature.

Optionally, the solid composition may be subject to breaking or milling. The solid composition may also be compressed into tablets. The solid composition may also be encapsulated. It is appreciated that the solid composition may be in any desired size or shape.

The solid composition according to the present application may be used for various home care and personal care applications, in particular, for fabric conditioning. Alternatively, the solid composition can serve as a premix which may be used by industrial users for preparing aqueous compositions for home care and personal care applications.

In one embodiment, the solid composition may be used for conditioning a fabric in a dryer which is used for the removal of water. The dryer in which the solid composition of the present invention can be used include any type of dryer that uses heat and/or agitation and/or air flow to remove water from the fabric. An exemplary dryer includes a tumble-type dryer where the fabric is provided within a rotating drum that causes the fabric to tumble during the operation of the dryer. Tumble-type dryers are commonly found in industrial and institutional sector laundry operations. By the term, "industrial and institutional" it is meant that the operations are located in the service industry including but not limited to hotels, motels, restaurants, health clubs, healthcare, and the like. The solid composition may be provided for releasing an effective amount of the solid composition to the fabric during a drying cycle in the dryer to impart the desired benefits to the fabric, such as softness. The solid composition may be placed inside the dryer, for example, the solid composition may be placed on an interior wall of the dryer or be placed freely in the dryer, so that the solid composition contacts the fabric that is being dried. When being used in the dryer, the solid composition is preferably in the shape of a block, a pellet, a sheet or a ball.

In another embodiment, the solid composition may serve as a premix which may be used, preferably by industrial users, for preparing aqueous compositions for home care and personal care applications.

Accordingly, in one aspect of the present invention, there is provided a process for preparing a liquid composition comprising the step of mixing the solid composition described herein with a solvent, such as water, organic solvents and mixture thereof. In another aspect of the present invention, there is provided a process for preparing a liquid composition comprising the step of mixing the solid composition obtained by the process described herein with a solvent, such as water, organic solvents and mixture thereof. The mixing may be done by adding the solid composition to the solvent already present in a recipient, such as a tank, and optionally with stirring. The mixing may be done at 10 to 70° C., preferably from 30 to 60° C. The liquid composition may be in the form of a solution, a suspension, a dispersion, an emulsion, a foam, a gel, a slurry or the like. For better dispersability, a preferred form of the liquid composition is in the form of an aqueous dispersion in water. The dosage of the solid composition used for preparing the liquid composition can be determined according to the needs. In one preferred embodiment, the liquid composition is an aqueous fabric conditioning composition.

It is appreciated that the optional components described hereabove can either be added during the process of preparing the solid composition or be added at the stage of preparing the liquid composition.

Depending on the needs, at the time of preparing the liquid composition, additional amount of the quaternary ammonium compound and/or the polysaccharide may be added to the liquid composition on top of the solid composition of the present invention.

In one aspect, the present invention also provides a liquid composition obtained by the process described herein.

In another aspect, the present invention concerns a method of conditioning a fabric comprising the step of contacting the fabric with the liquid composition as described herein. Typically the liquid composition may be added during a rinse cycle of an automatic laundry machine or during manual wash. One aspect of the invention provides dosing the liquid composition of the present invention during the rinse cycle of the automatic laundry machine or during the manual wash. Another aspect of the invention provides for a kit comprising the liquid composition of the present invention and optionally instructions for use. When being used in the rinse process, the liquid composition is first diluted in an aqueous rinse bath solution. Subsequently, the laundered fabrics which have been washed with a detergent liquor and optionally rinsed in a first inefficient rinse step ("inefficient" in the sense that residual detergent and/or soil may be carried over with the fabrics), are placed in the rinse solution with the diluted composition. Of course, the liquid composition may also be incorporated into the aqueous bath once the fabrics have been immersed therein. Following that step, agitation is applied to the fabrics in the rinse bath solution causing the suds to collapse, and residual soils and surfactant is to be removed. The fabrics can then be optionally wrung before drying.

Some of the advantages of the present invention are as below:

(1) The solid composition of the present invention is easy for transportation and storage, thus, it is more convenient and economical for users, especially for industrial users.

(2) The solid composition is stable solid at temperatures up to 45° C. and has prolonged shelf life. Liquid systems containing the quaternary ammonium compound and the polysaccharide are usually not stable and have the problem of phase separation. In contrast, the solid composition according to the present invention does not have such problem. One challenge of the present invention is that the solid composition may be used or stored under high temperature environments, for example, in tropical zones. If the solid composition is easy to melt when being exposed to the high temperature environment, the quaternary ammonium compound and the polysaccharide may separate and the composition may no longer be homogenous. It has been found that the solid composition of the present invention can remain stable solid at temperatures up to 45° C., thus the quaternary ammonium compound component and the polysaccharide component do not undergo phase separation.

(3) The solid composition comprise high percentages of the quaternary ammonium compound and the polysaccharide, which provide more freedom for industrial uses to blend the solid composition with solvents or other components to achieve the desired concentration of the components.

The following examples are included to illustrate embodiments of the invention. Needless to say, the invention is not limited to the described examples.

EXAMPLE

Materials:
Quat:
TEP: Di(palmiticcarboxyethyl)hydroxyethyl methyl ammonium methylsulfate; Fentacare TEP softener (from Solvay);
DEEDMAC: Diethyl Ester Dimethyl Ammonium Chloride from Sovlay;
Polysaccharides from Evonik Industries;
Polysaccharide 1: a natural guar gum from Solvay;
Polysaccharide 2: a guar hydroxypropyltrimonium chloride having a molecular weight below 1M daltons from Solvay;
Polysaccharide 3: a hydroxypropyl guar hydroxypropyltrimonium chloride having a molecular weight of approximately 1.5 M from Solvay;
Polysaccharide 4: a hydroxypropyl guar having a molecular weight of between 2,000,000 and 3,000,000 from Sovlay;
Polysaccharide 5: a guar hydroxypropyltrimonium chloride having a molecular weight of approximately 2M daltons from Solvay;

Solid compositions are prepared according to the formulation under the Component Panel in Table 1 ("S" means "Sample" and "Com. S" means "Comparative Sample").

The process for preparing the compositions is as below:
(1) The quat was melt in a top open mixer at a temperature of 45 to 55° C. with stirring at a speed of 100 to 300 rpm. The heating time was 15 to 30 mins.
(2) Certain amounts of polysaccharide powder and hydrophobic compounds were added to the molten quat, and then mixed with agitation at a speed of 500 rpm. The mixing time was 15 to 30 mins and the mixture was subject to continuous heating during the mixing.
(3) After the mixture became homogenous, the mixture was cooled down to the ambient temperature.

The processibility of the solid compositions means whether the components of the solid composition are easy to be mixed and to form a homogenous mixture. For such assessment, the quat or the hydrophobic compound was heated to a temperature above its melting point, then the polysaccharide (also the hydrophobic compound, as the case may be) was added to the melt and the mixture was stirred at 500 rpm. It is observed whether the components can be well mixed and form a homogenous mixture.

The stability of the solid compositions was assessed by putting the solid composition in an oven at 45° C. Then the solid compositions were taken out of the oven every 7 days. The physical state and appearance of the solid compositions were observed immediately after the solid compositions being taken out of the oven. The samples were tested for up to 60 days.

Results were shown under the Results Panel in Table 1:

TABLE 1

| | S1 | S2 | S3 | S4 | S5 | Com. S1 |
|---|---|---|---|---|---|---|
| Component (wt %) | | | | | | |
| TEP | | | 49 | | 1 | 92 |
| DEEDMAC | | 49 | | 7 | | |
| Polysaccharide 1 | 25 | | | | | |
| Polysaccharide 2 | | 50 | | | | |
| Polysaccharide 3 | | | 1 | | | |
| Polysaccharide 4 | | | | 3 | | |
| Polysaccharide 5 | | | | | 75 | 8 |
| Paraffin wax | | 1 | | | | |
| Glyceryl stearate | | | 50 | 90 | | |
| Cetyl alcohol | 75 | | | | 24 | |
| Total | 100 | 100 | 100 | 100 | 100 | 100 |
| Results | | | | | | |
| Stability | >60 days | >60 days | >60 days | >60 days | >60 days | <7 days |
| Processibity | Easy to process | Easy to process | Easy to process | Easy to process | Easy to process | Easy to process |

As shown in Table 1, the solid compositions in all the samples were easy to form homogenous mixture and exhibited excellent processibility. Also, it was noted that the solid composition of Samples 1 to 5 remained stable solid and homogenous when being exposed to 45° C. for up to 60 days. In contrast, the solid composition of Comparative Sample 1 showed phase separation when being exposed to 45° C. for 7 days.

The invention claimed is:

1. A solid composition comprising a polysaccharide and a hydrophobic compound having a melting point of between 30° C. and 90° C. wherein the polysaccharide is a cationic guar, a nonionic guar, or a mixture thereof; and wherein the hydrophobic compound is an ester of a fatty acid.

2. The solid composition according to claim 1, wherein the solid composition further comprises a quaternary ammonium compound, and the weight ratio of the polysaccharide and the hydrophobic compound is between 1:50 and 50:1.

3. The solid composition according to claim 2, wherein the weight ratio of the polysaccharide and the hydrophobic compound is between 1:30 and 30:1.

4. The solid composition according to claim 2, wherein the weight ratio of the polysaccharide and the hydrophobic compound is between 1:10 and 10:1.

5. The solid composition according to claim 2, wherein the quaternary ammonium compound has the general formula (I):

$$[N^+(R_1)(R_2)(R_3)(R_4)]_y X^- \quad (I)$$

wherein: $R_1$, $R_2$, $R_3$ and $R_4$, which may be the same or different, is a $C_1$-$C_{30}$ hydrocarbon group, optionally containing a heteroatom or an ester or amide group;
X is an anion; and
y is the valence of X.

6. The solid composition according to claim 2, wherein the quaternary ammonium compound has the general formula (III):

$$[N^+((CH_2)_n\text{-}T\text{-}R_8)_2(R_8)(R_9)]_y X^- \quad (III)$$

wherein:
$R_9$ group is independently selected from $C_1$-$C_4$ alkyl or hydroxylalkyl group;
$R_8$ group is independently selected from $C_1$-$C_{30}$ alkyl or alkenyl group;
T is C(=O)—O— or O—C(=O)—;
n is an integer from 0 to 5;
X is an anion; and
y is the valence of X.

7. The solid composition according to claim 2, wherein the quaternary ammonium compound has the general formula (IV):

$$N^+(C_2H_4\text{-}OOCR_{10})_2(CH_3)(C_2H_4\text{—}OH_3)_z SO_4^- \quad (IV)$$

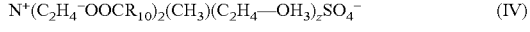

wherein $R_{10}$ is a $C_{12}$-$C_{20}$ alkyl group; and
z is an integer from 1 to 3.

8. The solid composition according to claim 2, wherein the quaternary ammonium compound is selected from the group consisting of:
TET: Di(tallowcarboxyethyl)hydroxyethyl methyl ammonium methylsulfate;
TEO: Di(oleocarboxyethyl)hydroxyethyl methyl ammonium methylsulfate;
TES: Distearyl hydroxyethyl methyl ammonium methylsulfate;
TEHT: Di(hydrogenated tallow-carboxyethyl)hydroxyethyl methyl ammonium methylsulfate;
TEP: Di(palmiticcarboxyethyl)hydroxyethyl methyl ammonium methylsulfate;
DEEDMAC: Dimethylbis[2-[(1-oxooctadecyl)oxy]ethyl] ammonium chloride; and
DHT: Dihydrogenated tallowdimethylammonium chloride.

9. The solid composition according to claim 1, wherein the solid composition is substantially free or completely free of water.

10. A process for preparing a solid composition comprising the steps of:
(i) combining a polysaccharide, a hydrophobic compound having a melting point of between 30° C. and 90° C., and a quaternary ammonium compound to obtain a mixture; and
(ii) solidifying the mixture;
wherein the weight ratio of the polysaccharide and the hydrophobic compound is between 1:50 and 50:1 wherein the polysaccharide is a cationic guar, a non-ionic guar, or a mixture thereof; and wherein the hydrophobic compound is an ester of a fatty acid.

11. The process according to claim 10, wherein the quaternary ammonium compound is melted, and the step (ii) is cooling the mixture.

12. A process for preparing a liquid composition, comprising the step of mixing the solid composition according to claim 1 with a solvent selected from water, organic solvents, or a mixture thereof.

13. A liquid composition obtained by the process according to claim 12.

14. The liquid composition according to claim 13, wherein the liquid composition is an aqueous fabric conditioning composition.

15. A method for conditioning a fabric, comprising the step of contacting the fabric with the solid composition according to claim 1 during a drying cycle of a dryer.

16. A method for conditioning a fabric, comprising the step of contacting the fabric with an aqueous medium comprising the liquid composition according to claim 13 during a rinse cycle of an automatic laundry machine or during manual wash.

* * * * *